(12) United States Patent
Dexter (10) Patent No.: US 12,485,830 B2
(45) Date of Patent: Dec. 2, 2025

(54) MULTIFUNCTIONAL CARGO MANAGEMENT RAIL

(71) Applicant: Timothy James Dexter, Orland, CA (US)

(72) Inventor: Timothy James Dexter, Orland, CA (US)

( * ) Notice: Subject to any disclaimer, the term of this patent is extended or adjusted under 35 U.S.C. 154(b) by 45 days.

(21) Appl. No.: 18/732,547

(22) Filed: Jun. 3, 2024

(65) Prior Publication Data

US 2025/0065812 A1    Feb. 27, 2025

Related U.S. Application Data

(60) Provisional application No. 63/628,758, filed on Aug. 21, 2023.

(51) Int. Cl.
*B60R 9/06*    (2006.01)

(52) U.S. Cl.
CPC ..................................... *B60R 9/06* (2013.01)

(58) Field of Classification Search
CPC .... B60R 9/00; B60R 9/06; B60R 7/02; B60R 7/08; B60R 11/00; B60P 1/003
USPC .... 224/404, 403, 405, 402, 543, 42.33, 510, 224/551, 553
See application file for complete search history.

(56) References Cited

U.S. PATENT DOCUMENTS

| | | | | |
|---|---|---|---|---|
| 5,427,288 | A * | 6/1995 | Trubee | B60R 7/02 |
| | | | | 224/567 |
| 7,644,972 | B2 * | 1/2010 | Lim | B60R 11/00 |
| | | | | 296/37.1 |
| 10,053,020 | B2 * | 8/2018 | Krishnan | B60J 7/106 |
| 10,252,680 | B2 * | 4/2019 | Presley | B60P 7/135 |
| 10,800,465 | B2 * | 10/2020 | Schuling | B60R 9/06 |
| 11,618,508 | B2 * | 4/2023 | Dexter | B62D 33/0207 |
| | | | | 224/404 |
| 11,623,502 | B1 * | 4/2023 | Williams | B60P 7/02 |
| | | | | 296/100.09 |
| 11,648,991 | B2 * | 5/2023 | Kananda | B62D 33/0207 |
| | | | | 224/404 |
| 12,024,133 | B2 * | 7/2024 | Wicken | B60P 7/0815 |
| 2008/0142560 | A1 * | 6/2008 | Lim | B60R 7/08 |
| | | | | 224/543 |

* cited by examiner

*Primary Examiner* — Corey N Skurdal
(74) *Attorney, Agent, or Firm* — Apex Juris, pllc; R. Lynette Wylie (57) ABSTRACT

A multifunctional cargo management rail device for a vehicle having an open cargo space such as a truck bed, having a mounting bracket pivotably attached to a side wall of the open cargo space with a mounting tube on a top edge and a telescoped rail tube having a dropped panel whereon storage receptacles or gear are fastened. The rail tube is configured to slide in a longitudinal direction along a linear track through the mounting tube such that the vertical panel passes through the first longitudinal slot and can also be axially pivoted to a tailgate or other access opening. A telescoping cargo retrieval pole concentrically positioned within the rail tube has a handle having a second function as a cargo hook for retrieval of articles beyond a user's ready reach.

20 Claims, 11 Drawing Sheets

MULTIFUNCTIONAL CARGO MANAGEMENT RAIL

CROSS-BENEFIT TO RELATED APPLICATION

The present application claims the benefit to priority and incorporates by reference the disclosure of U.S. Provisional Application Ser. No. 63/628,758 filed on Aug. 21, 2023 entitled Truck Bed Side-Mounted Telescoping Cargo Management System.

FIELD OF THE INVENTION

The present invention relates to cargo management devices and systems for use in open cargo spaces, particularly applicable to trucks, vans and utility trailers.

BACKGROUND OF THE INVENTION

Traditionally, pickup trucks, trailers and cargo vans have been primarily used for hauling used in various construction and other projects. To facilitate secure and organized storage of tools for such projects, supplies and gear are stored in various containers, such as, for example bins, belts, bags toolboxes that are often stacked and entail considerable repacking and maneuvering around superfluous articles in order to access needed objects. Conventional truck bed management systems lack adaptive mechanisms or systems facilitating ready retrieval in an accessible or convenient location and to fit or hold variously items of differing shapes and sizes.

Retrieving needed articles is particularly time consuming and burdensome when items are placed in a spot that cannot be readily reached. Such drawbacks are compounded when they are confined within a low ceiling or cover. For example, articles near the front of a truck bed that is covered with a canopy or tonneau cover are difficult to retrieve and sometimes require removal of obstacles and items on or around them. A particular drawback of existing storage systems results from the sidewall-mounted tonneau cover latches blocking access to items that are stored near or against the sides of the truck bed.

With the popularity pickup trucks, now commonly driven as a primary vehicle or for everyday use, such access issues are widespread. However, conventional truck bed accessories are ill-suited for organization and storage of the variety and types of items carried for such day-to-day activities. Many conventional systems, such as floor mounted sliding rails and frames built for industrial or construction use are heavy, awkward and not readily adaptable to the various items.

A further disadvantage of existing truck bed management systems is the lack of adaptive mechanisms to place them in an accessible or convenient location and to fit or hold variously items of differing shapes and sizes. Due to such shortcomings in known cargo management systems, items carried in truck beds are often unsecured, disorganized and inaccessible. Moreover, unfastened and unsecured items are subject to potentially damage due to movement induced by of sharp turns and sudden stops, or precipitation and are vulnerable to theft.

Hence, in the past, there has been a dearth of facile and adaptive cargo management accessories for securing, organizing and accessing a variety of articles. Thus, there persists a need for a facile and adaptive cargo management system that accommodates a range of uses in open cargo spaces, such as truck beds. In addition, there is a need for a system for organizing gear and storage receptacles within open cargo spaces.

SUMMARY OF THE INVENTION

Addressing such and other needs, the present multifunctional vehicle cargo management rail device and system provides an adaptable and accessible truck bed organizer for carrying, storage and organization of storage receptacles and gear, including tools, equipment, supplies and cargo. Various embodiments of the cargo management system for a vehicle having an open cargo space include a cargo rail station having an axially pivotable mounting bracket configured for pivotable attachment about a side edge to a side wall of the open cargo space, and a mounting tube affixed to portions proximate to a top edge of the mounting bracket.

In various embodiments, the mounting tube has a first longitudinal slot proximally aligned aside the top edge such that the slot faces the open cargo space along a full length of the mounting tube. In some embodiments, the mounting tube may be equipped with a height adjustable bracket fastenable through vertically elongate throughholes configured for secured engagement to the mounting tube whereby a fastener positions the multifunctional cargo management rail device at a desired height in order to clear obstacles and thereby facilitate access to storage receptacles and gear.

In various embodiments, the rail tube has a second longitudinal slot configured for aligned correspondence with the first longitudinal slot when telescoped within the mounting tube such that a distal end of the rail tube is suspended along an upper portion of the side wall the rail tube. A vertical panel configured suspended below a thin rod dimensioned for seated engagement along the length of the second longitudinal slot. The vertical panel is disposed between the rail tube and the floor of the open cargo space and includes fastener mechanisms for releasable attachment of storage receptacles or gear thereon.

In some embodiments, the vertical rail station panel is adapted for a truck bed. In such embodiments the vertical panel is dimensioned to fit around the wheel wells in the truck bed and, together with the rail tube and other components, to fit lengthwise across a truck bed tailgate opening.

Various embodiments feature a retaining latch configured for holding the cargo rail proximate to the sidewall of the vehicle. The retaining latch may be secured by manually inserting a fastening end within a receiver catching end. Some embodiments may employ a quick release lock having a fastener end that is disengaged from a receiving latch member in a single step. In some embodiments, the quick release lock may be activated and deactivated by a compression triggered locking mechanism.

Embodiments of the multifunctional cargo management rail device may further feature a telescoping cargo retrieval pole slidably disposed within the rail tube. The telescoping cargo retrieval pole may have a handle on an end protruding from the retrieval end of the rail tube. In various embodiments, the handle has a latch mechanism for engaging and disengaging a base portion from the retrieval end of the rail tube.

Numerous fastener mechanisms may be employed to attach storage receptacles and gear such as tools, supplies or cargo to the rail station vertical panel. Fasteners may include a molle panel, corresponding strips of loop and hook material commercially known as Velcro®, as well as, various corresponding loops and clasps, quick release pins, clips, carabiners, open lines for tying and bungees. Various embodiments feature fastener members including one or more longitudinally disposed elongate strips affixed in a parallel, aligned orientation with the elongate strip have aperture slots with corresponding hooks, configured for releasable coupling to the aperture slots, affixed to the storage receptacle or gear facilitate ready attachment and detachment to the rail station vertical panel. In some embodiments, the one or more fastener members includes corresponding hook or loop material for fastening cargo storage receptacles or gear.

The multifunctional vehicle cargo management rails have fasteners and dimensions adaptable to a range of storage receptacles and gear. Storage receptacles may include sleeves, pockets, bags, packs or cases of various rigid, semi-rigid and flexible materials, sizes and shapes. Storage receptacles and fastening means are further adaptable to various categories and types of gear or tools and may be configured for a dedicated or general purpose.

The multifarious advantages of the various embodiments including such adaptability to various applications impart substantial efficacies. Some such efficacies result from facilitating ready access in a bidirectional retrieval-both along a linear or pivoted to traverse an access space such as a tailgate opening. An additional efficacy imparted by the adaptive features of the various embodiments ensues from positioning the mounting bracket at a height below a tonneau cover and latches securing it on the truck bed, thus enabling access to the storage receptacles and gear fastened to the cargo rail device. A further advantage is the ready access to the telescoping cargo retrieval pole by grasping the handle conveniently placed at the tailgate opening. The handle end provides the added facility of extending blunt hook to grab and pull articles in the rear of the open cargo space toward the tailgate.

DETAILED DESCRIPTION OF THE EMBODIMENTS

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Throughout the following detailed description, representative examples of features of the present multifunctional cargo management rail system are disclosed to illustrate aspects of the claimed invention. Related features in the examples may be identical, similar, or dissimilar. The reader should understand that a given feature need not be the same or similar to the specific portrayal. It should therefore be understood that the representative embodiments illustrated in FIGS. 1-11 is adapted to vehicles, particularly pickup trucks, cargo trailers and vans. However, it is readily understood that the claimed and described features of other embodiments of the claimed invention may be adaptable to other applications, including, for example, storage containers, household containers, or any other storage and organizational articles.

All definitions, as used herein, should be understood to control over dictionary definitions, documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used in the specification and in the claims, "or" is synonymous to "and/or" as defined above. For example, when separating articles in a list, "or" or "and/or" shall be interpreted as being inclusive, i.e., the inclusion of at least one, but also including more than one, of a number or list of elements, and, optionally, additional unlisted articles. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

All transitional phrases such as "comprising," "including," "carrying," "having," "containing," "involving," "relating to," "composed of," and the like are to be understood to be open-ended, i.e., to mean including but not limited to.

As used herein, "fastener" refers to any suitable connective device or material such as, for example, a hook, clasp, strap, line, D-ring or caribiner, "hook-and-loop" strip or material commercially known as Velcro®, and/or a retainer clip, band, or bracket dimensioned and configured for a corresponding article, and may be fastened to the vertical panel. The fastener stay mechanism may employ a rigid immovably or stretchable, or hinged mechanism for fastening the storage receptable or gear to the vertical panel.

Referring to FIGS. 1-11, embodiments of the present disclosure may include a multifunctional cargo management rail device 10 for a vehicle having an open cargo space such as a truck bed 24, including a mounting bracket 1 configured for pivotable attachment about a side edge to a side wall of the truck bed 24.

Figure 4:
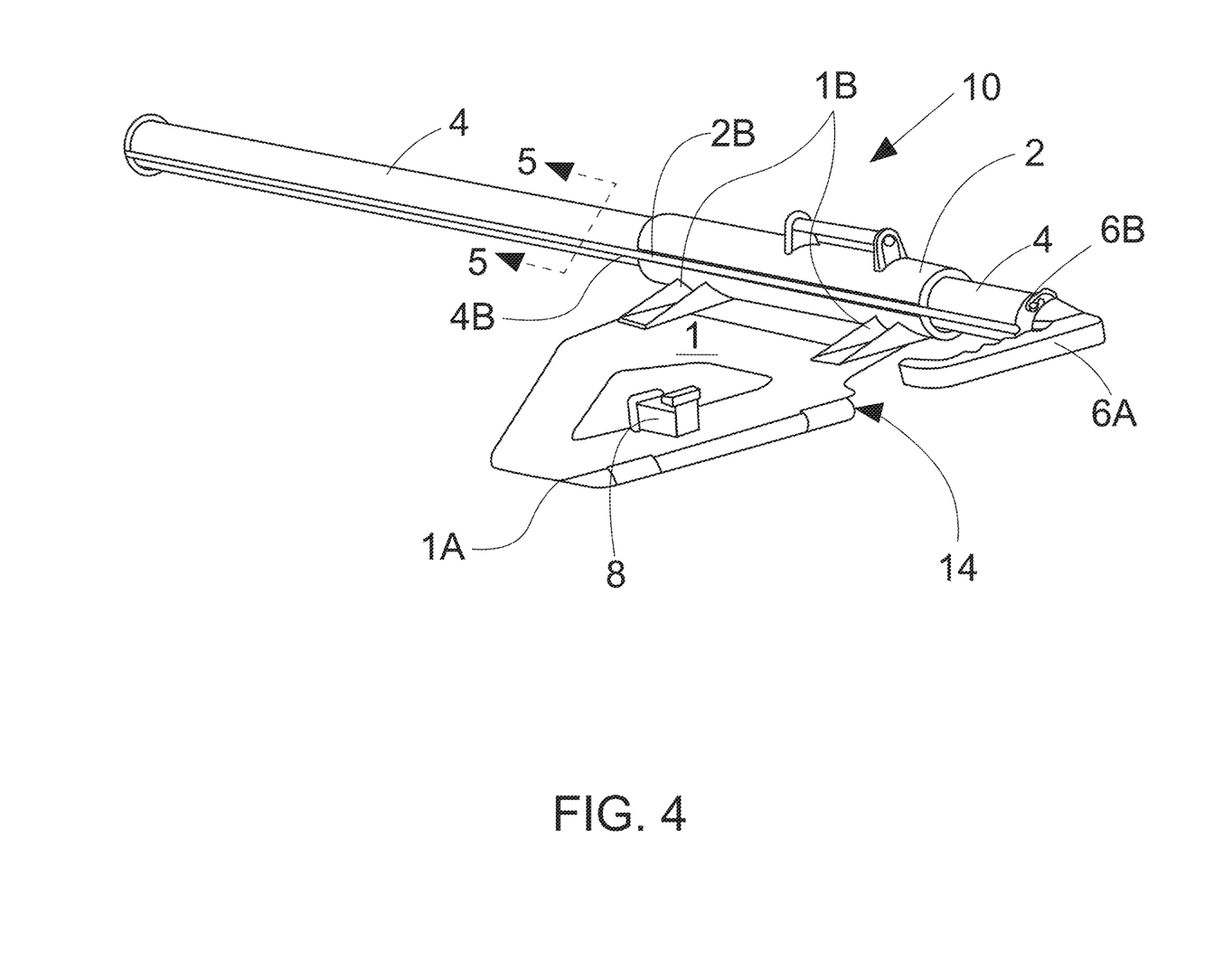
FIG. 4 is a bottom perspective view of the multifunctional vehicle cargo management system rail station member of FIG. 3.
Figure 5:
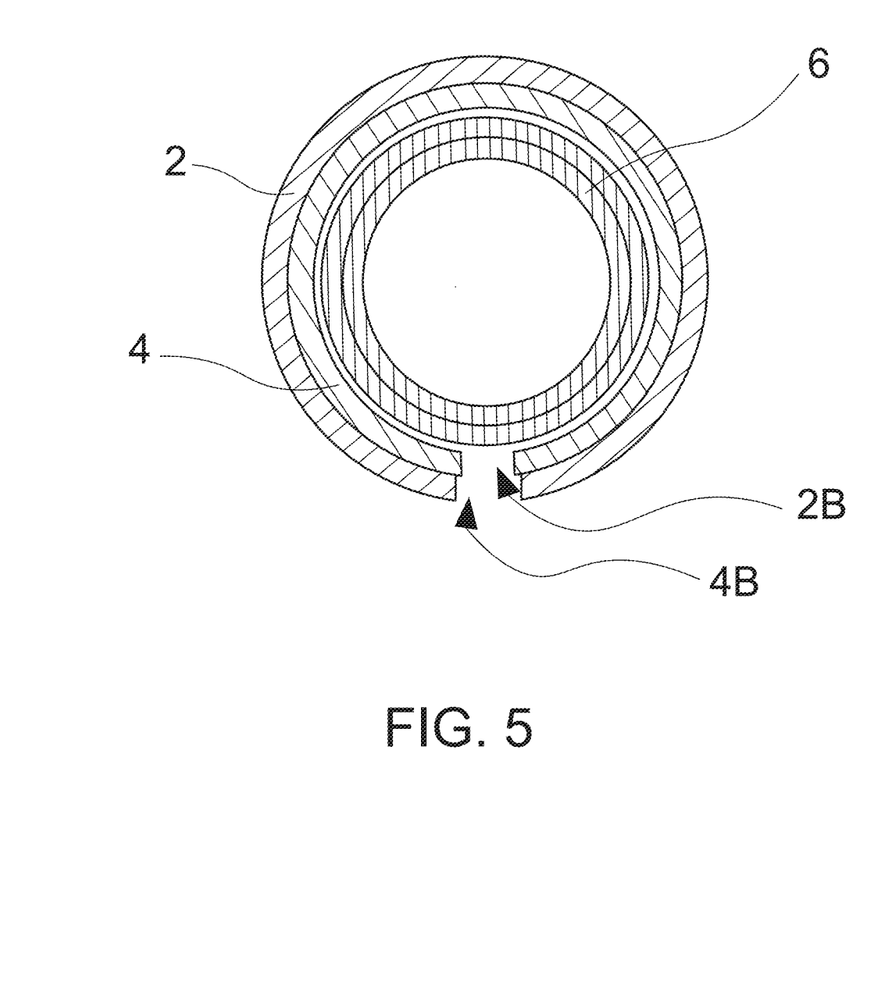
FIG. 5 is a cross-section view of the multifunctional vehicle cargo management system rail station member cut along lines 5-5 in FIG. 4, illustrating hidden telescoped mounting tube, rail station tube and cargo retrieval pole.
Figure 7:
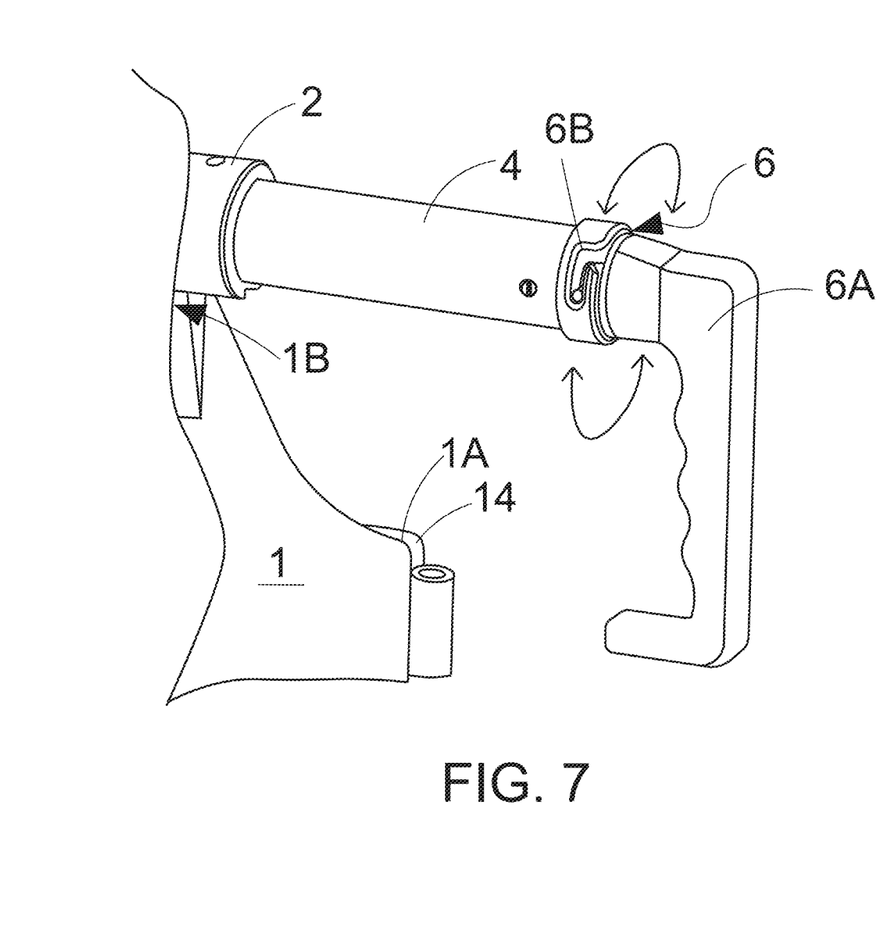
FIG. 7 is a close-up view of the multifunctional vehicle cargo management system cargo retrieval handle.

Now referring to FIGS. 4, 5 and 7, various embodiments may include a mounting bracket 1 has a mounting tube 2 affixed to a pair of brackets 1C fastened to a corresponding pair of vertical elongate throughholes 1B positioned proximate to a top edge of the mounting bracket 1 corresponding to brackets 1C configured for securing a fastener to thereby affix a height of the mounting tube along the track of the vertically elongate throughholes 1B so as to clear fixtures on or proximate to a top rail or portion of the truck bed 24, the rail tube 4 having a first longitudinal slot 2B along a full length along a bottom side thereof such that the first longitudinal slot 2B is proximally aligned aside the top edge of the mounting bracket 1 such that the longitudinal slot 2 aligns with the side of the mounting bracket facing the truck bed 24.

Various embodiments further feature a rail tube 4 having a distal end and a retrieval end configured for telescoping within the mounting tube such that a distal end of the rail tube 4 may be suspended along an upper portion of the side wall when received within the rail tube 4, the rail tube 4 having a second longitudinal slot 4B configured for aligned correspondence with the first longitudinal slot 2B when the rail tube 4 may be telescoped in the mounting tube 2. As best depicted by dashed directional arrow in the truck bed 24 of FIG. 1, the mounting bracket 1 is configured to be axially pivotable along directional line P about a plane in parallel alignment to a floor to traverse an opening such as tailgate opening 26 to the open cargo space such as the truck bed 24 at tailgate position TP as shown in FIG. 2. As depicted by the dashed directional arrow on the bottom right of FIG. 1, rail tube 4 is configured to slide in a longitudinal direction along a linear track through the mounting tube such that the vertical panel passes through the first longitudinal slot to move from retracted position RP to a protracted position PP or removed from the mounting bracket 1 and mounting tube 2.

As illustrated in FIG. 2, exemplary rail tube 4 is configured to fit lengthwise across a truck bed tailgate opening 26. Embodiments may also include a dropped vertical panel 18 having one or more fastener members configured for releasable fastening of storage receptacles or gear 12. In some embodiments, the vertical panel 18 may be suspended below a thin rod 18D dimensioned for seated engagement along the length the first longitudinal slot 2B and the second longitudinal slot 4B. In some embodiments, the vertical panel 18 may be dimensioned so as to dispose the vertical panel between the rail tube 4 and the floor of the open cargo space 24 when the thin rod 18D may be inserted within the rail tube 4.

Figure 1:
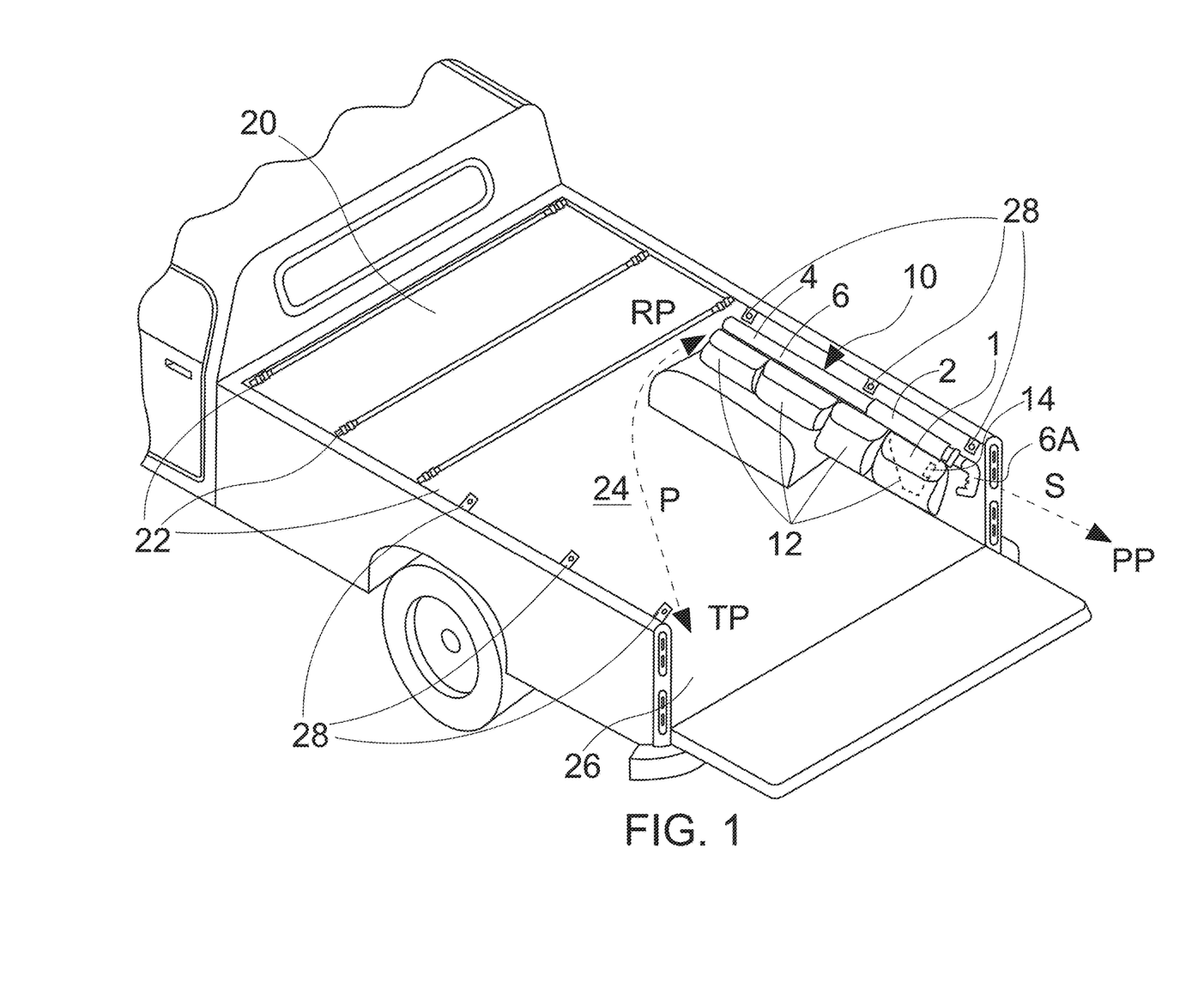
FIG. 1 is a perspective rear top view of an embodiment illustrating the multifunctional vehicle cargo management system when in retained position along a side wall of a truck bed.
Figure 2:
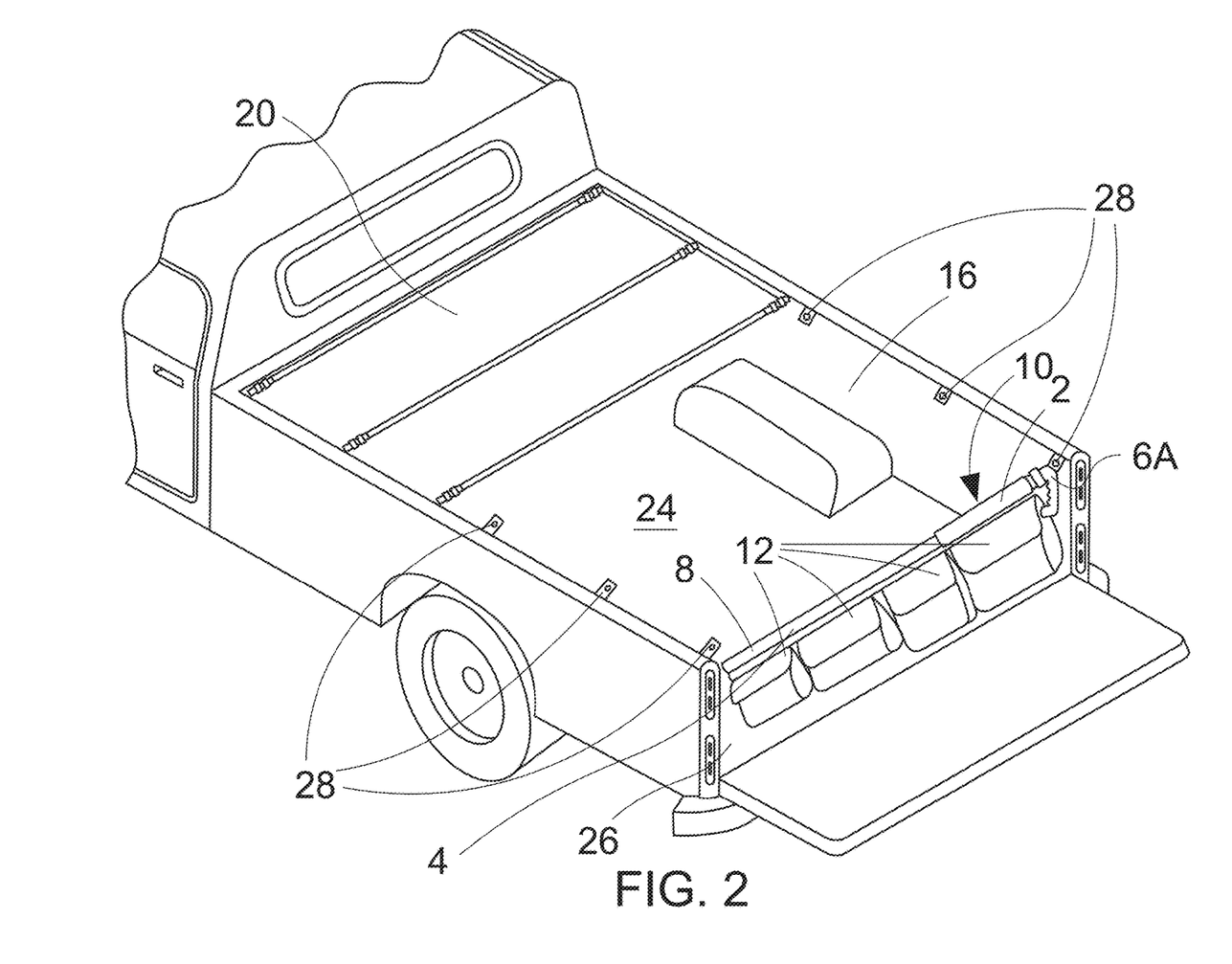
FIG. 2 is a second perspective view of an embodiment of the multifunctional vehicle cargo management system pivoted to a retrieved position disposed in a tailgate opening.
Figure 6:
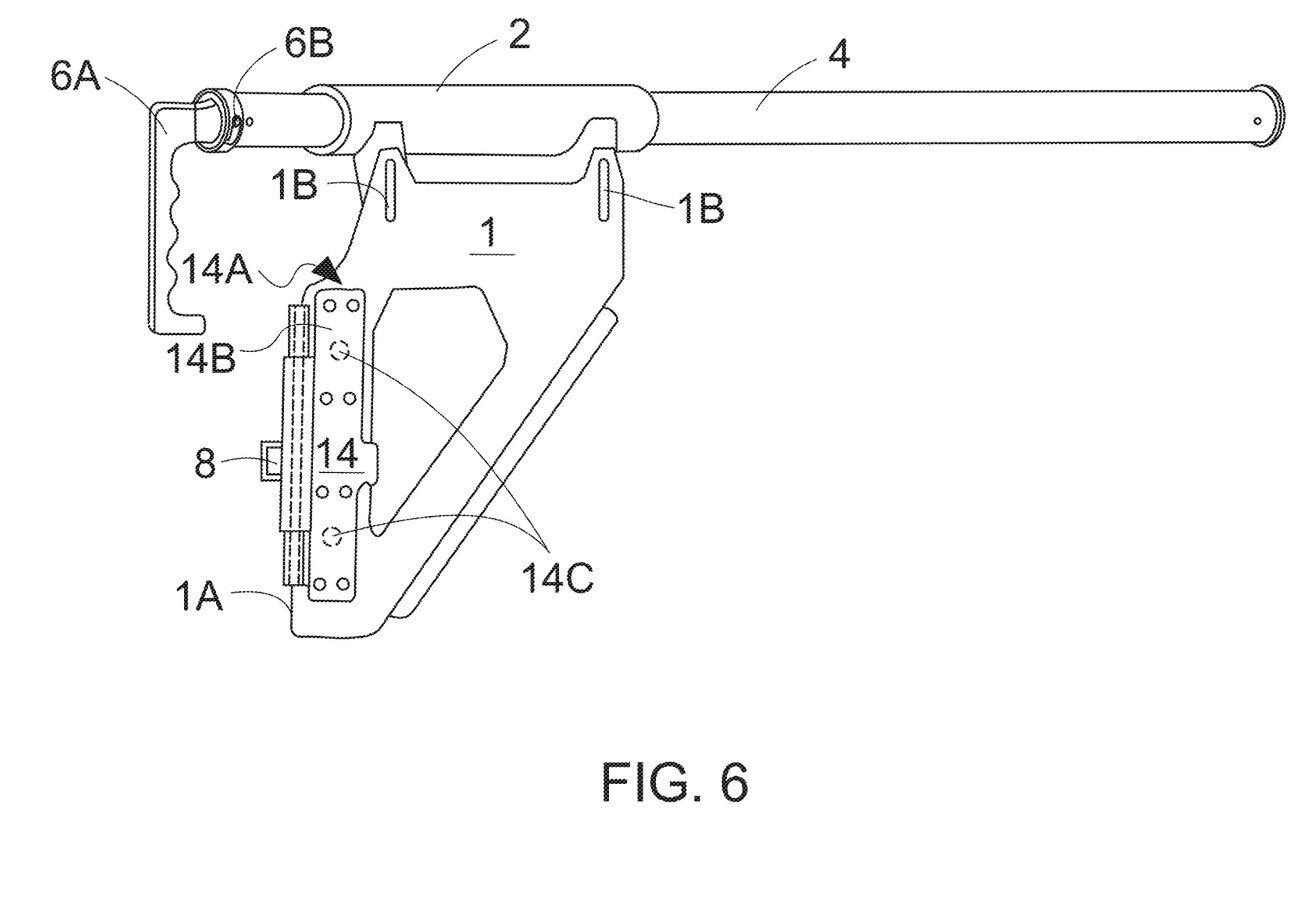
FIG. 6 is a rear side view of the multifunctional vehicle cargo management system rail station member.

As can be seen in FIGS. 1-2, positioning the mounting bracket 1 at a height below a tonneau cover 20 shown folded back and latches 28 securing it on the truck bed enables clearing the tonneau cover latches 28 when retrieving cargo management rail 10 in order to access the storage receptacles and gear 12 fastened to the cargo rail device. As shown in FIG. 6, elongate throughhole 1B enables vertical adjustment of the mounting bracket 1 in order adapt the height of cargo management rail 10 to a desired height in order to clear obstacles and ease access. Referring again to FIGS. 1-2, the cargo rail device 10 may be positioned below tonneau cover latches 28 thereby enabling access to storage receptacles or gear 12 without the cumbersome and time-consuming chore of removing the tonneau cover 20.

In some embodiments, the multifunctional cargo management rail device 10 may include a retaining latch 8 having a receiving latch member affixed proximate to the side edge of the mounting bracket 1 and a fastener end affixed to the side wall of the truck bed 24 proximate to the tailgate opening 26 such that the receiving end and the fastener end may be in alignment for releasable coupled engagement. As exemplified in FIG. 1, the cargo management rail station 10 is maintained in a retracted position RP proximate to the sidewall of the vehicle when the retaining latch 8 is engaged.

Figure 3:
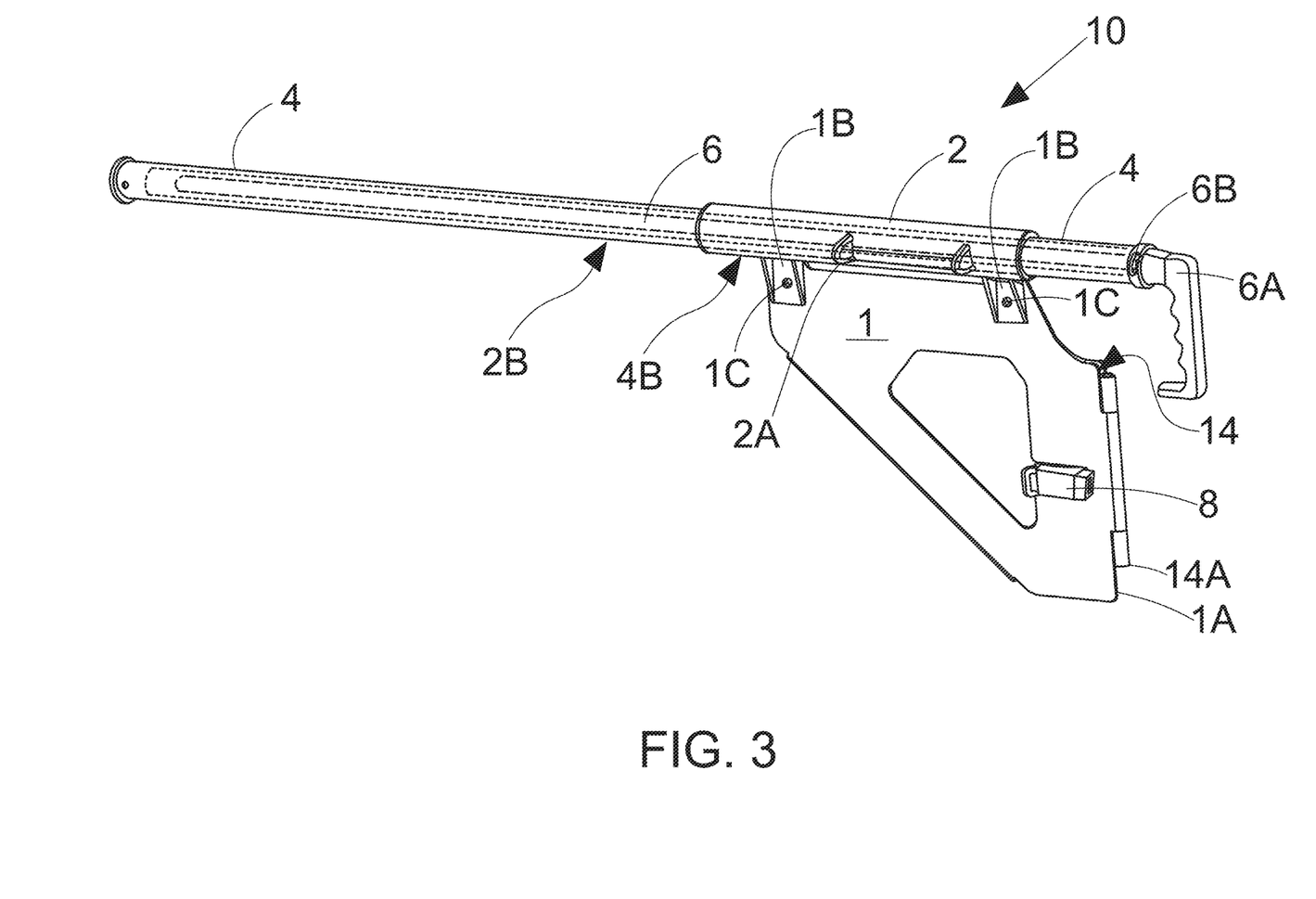
FIG. 3 is a front view of the multifunctional vehicle cargo management system. illustrating hidden telescoped mounting tube, rail station tube and cargo retrieval pole.

As shown in FIGS. 3 and 4, embodiments may further feature a retaining latch 8 as a quick release lock having a fastener end that may be disengaged from a receiving latch member in a single step. In some embodiments, the fastener end and a receiving member may be activated and deactivated by a compression triggered locking mechanism.

As shown in FIGS. 1-7 and 11, various embodiments of the multifunctional cargo management rail device 10 feature a telescoping cargo retrieval pole 6 slidably disposed within the rail tube 4. The telescoping cargo retrieval pole 6 has a handle 6A on an end protruding from the retrieval end of the rail tube 4. In addition to facilitating retrieval from the cargo rail station 10, handle 6A can also be deployed as a cargo hook for grabbing the rear surface of articles that are out of reach and then pulled forward toward the front of the truck bed or other open cargo space 24.

In various embodiments, the handle 6A has a latch mechanism 6B for engaging and disengaging a base portion of telescoping cargo retrieval pole 6 from the retrieval end of the rail tube 4. As best conveyed in FIGS. 6-7, the latch mechanism 6B may employ catch slots bridged on opposed ends of a channel whereby a protruding knob on the cargo retrieval pole 6 is configured to engage and disengage a corresponding catch slot and thereby engage and disengage the latch mechanism 6B by pivoting the handle a quarter of a full circle turn.

Figure 8:
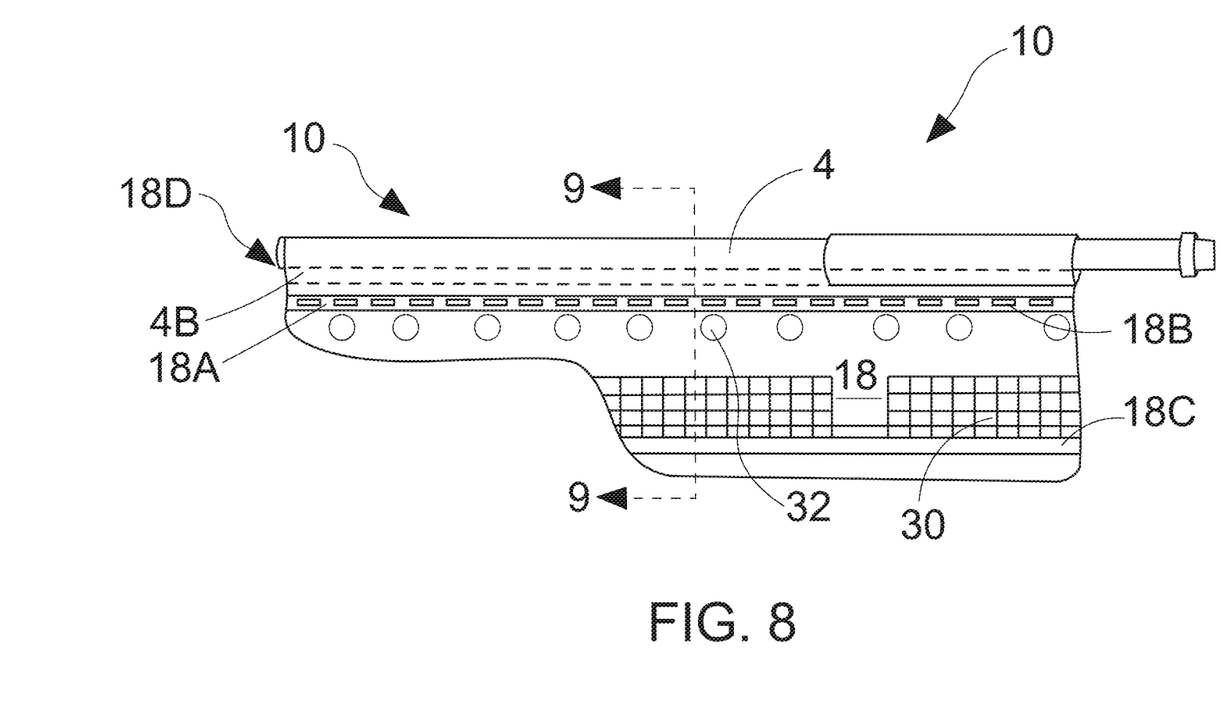
FIG. 8 is a view of the multifunctional vehicle cargo management system rail station member.
Figure 9:
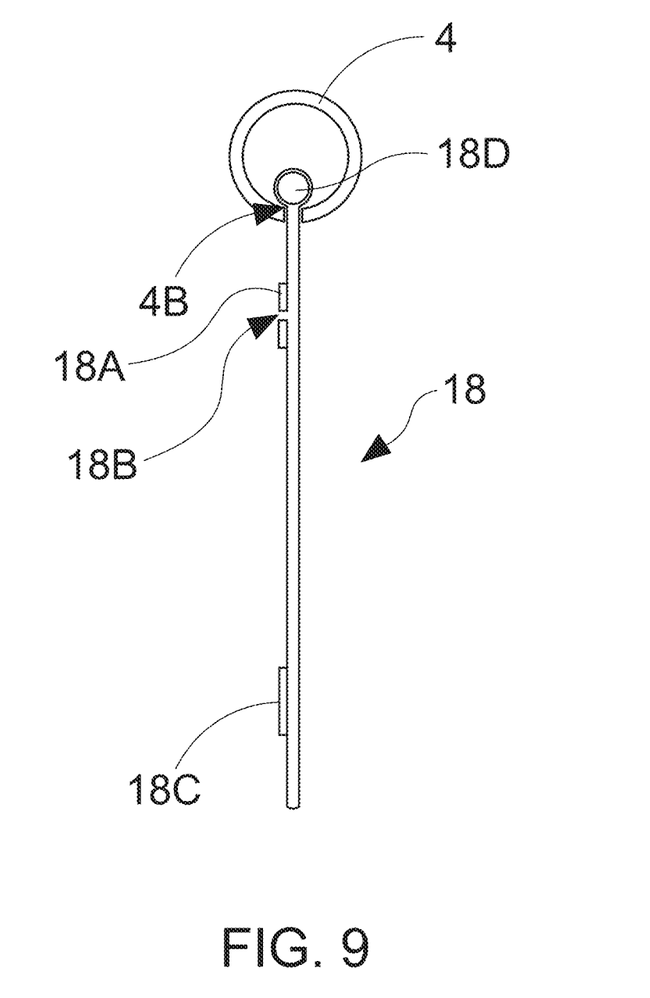
FIG. 9 is a cross-section view of FIG. 8 cut along lines 9-9.
Figure 10:
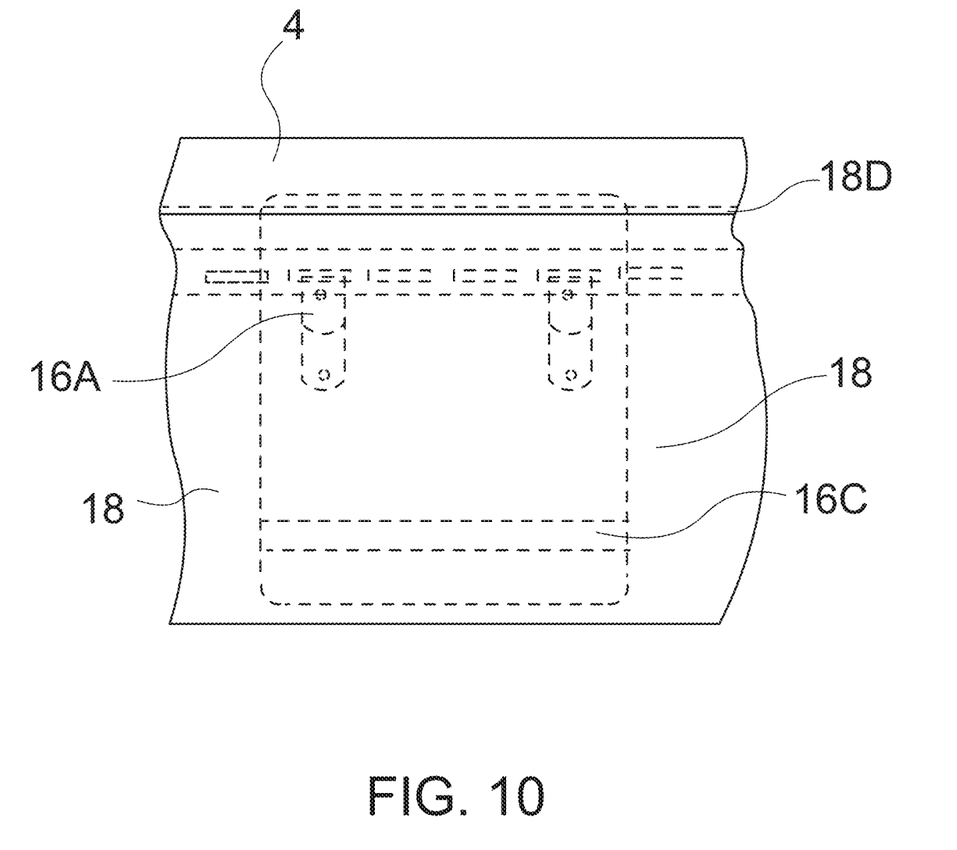
FIG. 10 is a cut-away rear view of the multifunctional vehicle cargo management system.
Figure 11:
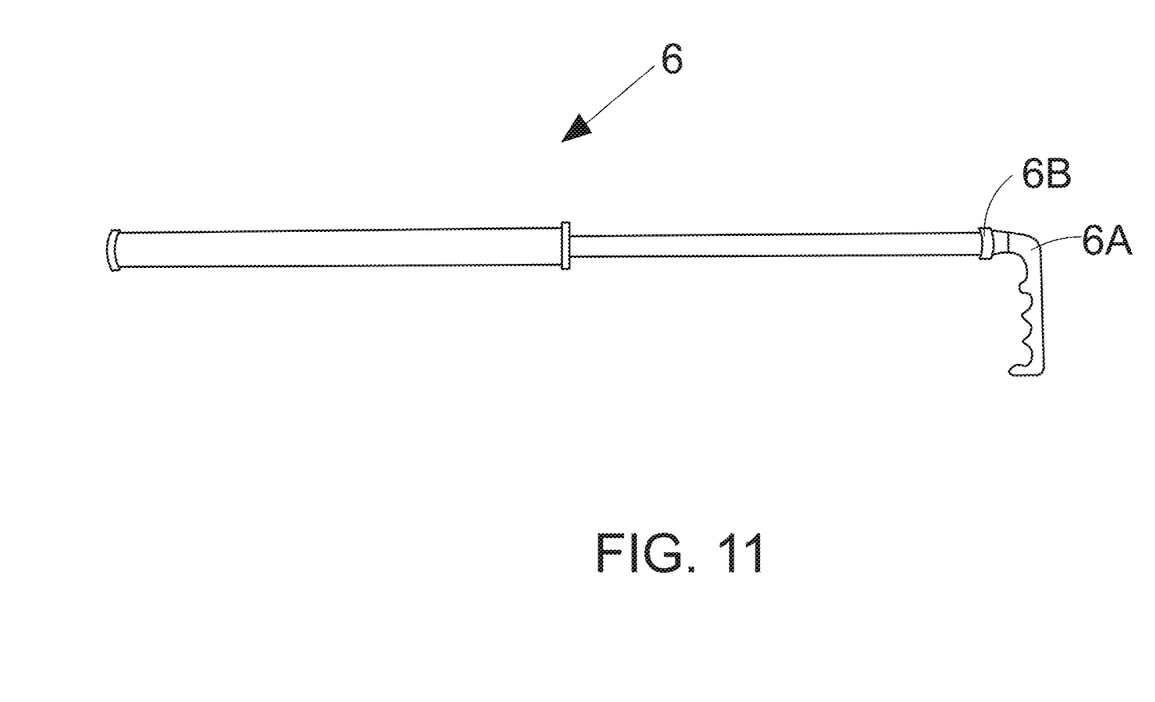
FIG. 11 is a perspective view of the cargo retrieval pole in extended position.

Referring to FIG. 8, some embodiments include the one or more fastener members employing a molle panel 30. Alternative embodiments may include one or more fastener members including one or more elongate strips 18A affixed in disposed in an orientation corresponding to the type of storage receptacle or gear being attached thereto. Such elongate strip(s) may have a plurality of aperture slots 18B for releasable coupling with corresponding fasteners.

In various alternative embodiments, numerous fastener mechanisms may be employed to attach storage receptacles and gear such as tools, supplies or cargo. Fasteners may include a molle panel 30, corresponding strips of loop and hook material 16C commercially known as Velcro® as well as various loops, clasps, magnetic fasteners, quick release pins, clips, carabiners, open lines for tying and bungees, graphically represented collectively as 32. Various embodiments feature fastener members including one or more longitudinally disposed elongate strips 18A with a plurality of aperture slots 18B affixed in a parallel, aligned orientation within the elongate strip 18A. Corresponding fasteners have hook portions 16A configured for releasable coupling to the aperture slots affixed to the storage receptacle or gear 12 facilitate ready attachment and detachment. In some embodiments, the one or more fastener members includes hook or loop material for fastening cargo carriers or gear.

In some embodiments, the storage receptacles or gear 8 may be a member of a group consisting of sleeves, pockets, bags, packs or cases graphically illustrated collectively as 30. In some embodiments, the rail tube 4 may be configured to fit within the space for a door to the open cargo space 24 when the door may be open.

In various embodiments, the one or more fastener members may include an elongate strip 18A extended between an upper edge and a lower edge disposed in parallel and aligned orientation proximate to the upper edge of the elongate strip 18A. In some embodiments, a plurality of aperture slots 18B are disposed along a portion of the elongate strip 18A wherethrough a corresponding fastener configured for releasable coupling to the aperture slots 18B may be affixed to a corresponding storage receptacle or gear 12. Also exemplified in FIG. 8 are embodiments having an elongate strip having hooks or loops 18C for releasable fastening of opposed hooks or loops 18C on a corresponding storage receptable or piece of gear 12. Thus, cargo management rail device 10 provides a highly adaptable organization scheme enabling ready access to various sizes and types of items through a bidirectional system for conveniently stowing and detachment via a range of fasteners to accommodate a wide number of preferences and uses.

In sum, the vehicle cargo management rail device and system according to the numerous various embodiments provides a durable, adaptive, storage and organizer apparatus enabling convenient and facile access to items in an open cargo space of a vehicle such as, for example, a truck bed.

The description herein is not intended to delimit the scope of this invention which extends to various embodiments of the support garment of the present invention. For example, alternative embodiments may vary the configuration of storage receptacles and/or fasteners to adapt to particular items or applications. For example, a closure mechanism such as a zipper, clasp or gathered tether could be used on the upper edge to secure the contents therein. Alternatively, some embodiments may feature a single elongate pocket for carrying rods or lengthy items such as, for example, tent or fishing poles. In yet other embodiments contemplated by the present invention, the storage receptacles may be lined with a protective or insulating fabric or equipped with dividers to separate the hollow compartment into separate storage units.

It is therefore contemplated that other embodiments not illustrated in the drawings or described herein are considered to be within the scope of the present invention as set forth in the claims. Accordingly, configurations and combinations shown and described not specifically shown may diverge from those claimed and specified herein. The scope of the present invention thus includes any equivalent configuration or combination of the embodiments described herein.

The invention claimed is:

1. A multifunctional cargo management rail device for an open cargo space, comprising:
    a mounting bracket configured for pivotable attachment about a side edge to a side wall of the open cargo space, wherein the mounting bracket is axially pivotable along a plane in parallel alignment to a floor of the open cargo space;
    a mounting tube affixed to an upper portion proximate to a top edge of the mounting bracket, a bottom side of the mounting tube having a first longitudinal slot along a full length thereof, the first longitudinal slot being proximally aligned along a portion of the top edge of the mounting bracket such that the first longitudinal slot faces the open cargo space;
    a rail tube having a distal end and a retrieval end configured for telescoping within the mounting tube such that a distal end of the rail tube is suspended along an upper portion of the side wall when received within the rail tube, the rail tube having a second longitudinal slot configured for aligned correspondence with the first longitudinal slot when the rail tube is telescoped in the mounting tube, and wherein the rail tube is configured to slide in a longitudinal direction along a linear track through the mounting tube such that the vertical panel passes through the first longitudinal slot to move from a retracted position to a protracted position; and
    a vertical panel having one or more fastener members configured for releasable fastening of storage receptacles or gear, wherein the vertical panel is suspended below a thin rod dimensioned for seated engagement along the length the first longitudinal slot and the second longitudinal slot, and wherein the vertical panel is dimensioned so as to dispose the vertical panel between the rail tube and the floor of the open cargo space when the thin rod is inserted within the rail tube.

2. The multifunctional cargo management rail device of claim 1, further comprising a retaining latch a retaining latch having a receiving latch member affixed proximate to the side edge of the mounting bracket and a fastener end affixed to the side wall of the truck bed proximate to the tailgate opening such that the receiving end and the fastener end are in alignment for releasable coupled engagement whereby the cargo rail station is retained proximate to the sidewall of the vehicle when the retaining latch is engaged.

3. The multifunctional cargo management rail device of claim 2, wherein the retaining latch is a quick release lock having a fastener end that is disengaged from a receiving latch member in a single step.

4. The multifunctional cargo management rail device of claim 3, wherein the fastener end and a receiving latch member are activated and deactivated by a compression triggered locking mechanism.

5. The multifunctional cargo management rail device of claim 1, further comprising a telescoping cargo retrieval rod slidably disposed within the rail tube, wherein the telescoping cargo retrieval pole has a handle on an end protruding from the retrieval end of the rail tube.

6. The multifunctional cargo management rail device of claim 1, wherein the handle has a latch mechanism for engaging and disengaging a base portion from the retrieval end of the rail tube.

7. The multifunctional cargo management rail device of claim 1, wherein the latch mechanism includes a slot configured to engage and disengage a corresponding fastener end whereby the latch mechanism is engaged and disengaged by turning of the handle.

8. The multifunctional cargo management rail device of claim 1, wherein the one or more fastener members employ a molle panel.

9. The multifunctional cargo management rail device of claim 1, wherein the one or more fastener members includes one or more elongate strips affixed to the vertical channel, wherein the one or more elongate strips have a plurality of aperture slots disposed along a portion of the elongate strip; and wherein a corresponding fastener configured for releasable coupling to the aperture slots is affixed to the storage receptacle or gear.

10. The multifunctional cargo management rail device of claim 1, wherein the one or more fastener members for fastening the storage receptacles or gear are members of the group consisting of loops and clasps, quick release pins, clips, magnetic stays, carabiners, open lines for tying, bungees and corresponding hook and loop material.

11. The multifunctional cargo management rail device of claim 1, wherein the upper portion of the mounting bracket includes a vertically elongate throughhole configured for securing a fastener to thereby position the mounting tube at a selected height within the track of the vertically elongate throughhole.

12. The multifunctional cargo management rail device of claim 1 wherein the storage receptacles or gear is a member of a group consisting of sleeves, pockets, bags, packs or cases.

13. The multifunctional cargo management rail device of claim 1, wherein the rail tube is configured to fit within the space for a door to the open cargo space when the door is open.

14. A multifunctional cargo management rail device for a truck bed, comprising:
- a mounting bracket having a top edge and a side edge about which a hinge mechanism pivotable about a side edge, wherein a front plate of hinge mechanism is affixed proximate to the side edge and a back plate of the hinge mechanism is affixed to a sidewall of the truck bed such that a mounting bracket is axially pivotable between the side wall and the tailgate opening;
- a mounting tube affixed to an upper portion of the surface proximate to the top edge of the mounting bracket so as to position the mounting tube in a substantially horizontal orientation, a bottom side of the mounting tube having a first longitudinal slot along a full length thereof, the first longitudinal slot being proximally aligned along a portion of the top edge of the mounting bracket such that first longitudinal slot faces the open cargo space, wherein the upper portion of the mounting bracket includes at least one vertically elongate throughhole configured for securing a fastener to thereby position the mounting tube at a selected height within the track of the vertically elongate throughhole;
- a rail tube having a distal end and a retrieval end configured for telescoping within the mounting tube such that a distal end of the rail tube is suspended along an upper portion of the side wall when received within the mounting tube, the rail tube having a second longitudinal slot configured for aligned correspondence with the first longitudinal slot when the rail tube is telescoped within the mounting tube, and wherein the rail tube is configured to slide in a longitudinal direction along a linear track through the mounting tube such that the vertical panel passes through the first longitudinal slot to move from a retracted position to a protracted position;
- a vertical panel configured for releasable fastening of storage receptacles or gear, wherein the vertical panel is suspended below a thin rod dimensioned for seated engagement along the length the second longitudinal slot when the thin rod is inserted within the rail tube so as to dispose the vertical panel between the rail tube and the floor of the truck bed, and wherein the rail tube is configured to fit lengthwise within a truck bed tailgate opening;
- a retaining latch having a receiving latch member affixed proximate to the side edge of the mounting bracket and a fastener end affixed to the side wall of the truck bed proximate to the tailgate opening such that the receiving end and the fastener end are in alignment for releasable coupled engagement when activated and deactivated by a quick release mechanism; and
- a telescoping cargo retrieval rod slidably disposed within the rail tube, wherein the telescoping cargo retrieval pole has a handle on an end protruding from the retrieval end of the rail tube, wherein the handle has a latch mechanism for engaging and disengaging a base portion from the retrieval end of the rail tube.

15. The multifunctional cargo management rail device of claim 14, wherein the retaining latch includes a compression triggered locking mechanism.

16. The multifunctional cargo management rail device of claim 14, wherein the vertical panel includes an elongate strip extended between an upper edge and a lower edge disposed in parallel, aligned orientation proximate to the upper edge of the elongate strip, wherein the elongate strip has a plurality of aperture slots disposed along a portion of the elongate strip; and wherein a corresponding fastener configured for releasable coupling to the aperture slots is affixed to a cargo carrier.

17. The multifunctional cargo management rail device of claim 14, wherein the vertical panel includes a molle panel and the one or more fastener members for fastening the storage receptacles or gear are members of the group consisting of loops and clasps, quick release pins, clips, magnetic stays, carabiners, open lines for tying, bungees and corresponding hook and loop material.

18. The multifunctional cargo management rail device of claim 14, further comprising a dampener member affixed to an inner surface of the hinge mechanism such that the dampener member dissipates frictional noise emitted when the cargo rail station is positioned against the side wall of the truck bed.

19. A multifunctional cargo management rail device for a truck bed, comprising:
- a mounting bracket configured for pivotable attachment about a side edge to a side wall of the truck bed, wherein the mounting bracket is axially pivotable along a plane in parallel alignment to a floor of the open cargo space;
- a mounting tube affixed along a longitudinal axis by one or more brackets to corresponding upper portions of the mounting bracket, the mounting tube having a first longitudinal slot along a full length on a bottom side thereof, the first longitudinal slot being proximally aligned along a portion of the top edge or the mounting bracket such that the first longitudinal slot faces the open cargo space, wherein the one or more brackets include at least one vertically elongate throughhole configured for securing a fastener to thereby position the mounting tube at a selected height within the track of the vertically elongate throughhole;
- a rail tube having a distal end and a retrieval end configured for telescoping within the mounting tube such that a distal end of the rail tube is suspended along an upper portion of the side wall when received within the rail tube, the rail tube having a second longitudinal slot configured for aligned correspondence with the first longitudinal slot when the rail tube is telescoped in the mounting tube, and wherein the rail tube is configured to slide in a longitudinal direction along a linear track through the mounting tube such that the vertical panel passes through the first longitudinal slot to move from a retracted position to a protracted position, and wherein the rail tube is configured to fit lengthwise within a truck bed tailgate opening;

a vertical panel configured for releasable fastening of storage receptacles or gear, wherein the vertical panel is suspended below a thin rod dimensioned for seated engagement along the length of the second longitudinal slot when the thin rod is inserted within the rail tube so as to dispose the vertical panel between the rail tube and the floor of the truck bed, and wherein the one or more fastener members includes an elongate strip extended between an upper edge and a lower edge disposed in parallel and aligned orientation proximate to the upper edge of the elongate strip, wherein the elongate strip has a plurality of aperture slots disposed along a portion of the elongate strip; and wherein a corresponding fastener configured for releasable coupling to the aperture slots is affixed to the storage receptacle or gear;

a retaining latch having a receiving latch member affixed proximate to the side edge of the mounting bracket and a fastener end affixed to the side wall of the truck bed proximate to the tailgate opening such that the receiving end and the fastener end are in alignment for releasable coupled engagement when activated and deactivated by a quick release mechanism; and a telescoping cargo retrieval rod slidably disposed within the rail tube, wherein the telescoping cargo retrieval pole has a handle on an end protruding from the retrieval end of the rail tube, wherein the handle has a latch mechanism for engaging and disengaging a base portion from the retrieval end of the rail tube.

20. The multifunctional cargo management rail device of claim 19, wherein the retaining latch is a quick release lock having compression triggered locking mechanism.

* * * * *